United States Patent
Arai et al.

(10) Patent No.: US 8,462,065 B2
(45) Date of Patent: Jun. 11, 2013

(54) ANTENNA APPARATUS AND COMMUNICATION APPARATUS

(75) Inventors: Hiroyuki Arai, Kanagawa (JP);
Takayuki Hirabayashi, Tokyo (JP);
Takashi Enomoto, Chiba (JP);
Sunghyuk Yoon, Nagano (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/203,434

(22) PCT Filed: Dec. 27, 2010

(86) PCT No.: PCT/JP2010/073550
§ 371 (c)(1),
(2), (4) Date: Oct. 27, 2011

(87) PCT Pub. No.: WO2011/083712
PCT Pub. Date: Jul. 14, 2011

(65) Prior Publication Data
US 2012/0280885 A1 Nov. 8, 2012

(30) Foreign Application Priority Data
Jan. 5, 2010 (JP) .................................. 2010-000739

(51) Int. Cl.
*H01Q 19/06* (2006.01)
(52) U.S. Cl.
USPC ........................... 343/754; 343/853; 343/860
(58) Field of Classification Search
USPC .................. 343/753, 754, 853, 860
See application file for complete search history.

(56) References Cited

U.S. PATENT DOCUMENTS

| 6,184,839 | B1 * | 2/2001 | Butscher et al. | 343/754 |
| 6,195,047 | B1 * | 2/2001 | Richards | 343/700 MS |
| 7,142,164 | B2 * | 11/2006 | Legay et al. | 343/754 |
| 7,782,261 | B2 * | 8/2010 | An et al. | 343/702 |
| 7,791,552 | B1 * | 9/2010 | Romanofsky | 343/754 |

FOREIGN PATENT DOCUMENTS

| JP | 51 077157 | 7/1976 |
| JP | 02 186728 | 7/1990 |
| JP | 05 160631 | 6/1993 |
| JP | 07 143102 | 6/1995 |
| JP | 2003 249809 | 9/2003 |

OTHER PUBLICATIONS

International Search Report issued Apr. 5, 2011 in PCT/JP10/073550 filed Dec. 27, 2010.

* cited by examiner

*Primary Examiner* — Tho G Phan
(74) *Attorney, Agent, or Firm* — Oblon, Spivak, McClelland, Maier & Neustadt, L.L.P.

(57) ABSTRACT

The present invention relates to an antenna apparatus and a communication apparatus able to provide an antenna apparatus having wide band characteristics or diversity characteristics. A first antenna element 11, a second antenna element 12, and a divider circuit 13 to which both the antenna elements 11 and 12 are coupled via respectively separate transmission lines 15 and 16 are included. Additionally, a delay process is conducted on one of the transmission lines by modifying the lengths of the transmission line 15 coupling the first antenna element 11 to the divider circuit 13 and the transmission line 16 coupling the second antenna element 12 to the divider circuit 13. By conducting this delay adjustment, the input impedance and/or phase of the first and second antenna elements are adjusted, and wider band characteristics than the antenna characteristics of the first and second antenna elements individually are configured.

11 Claims, 10 Drawing Sheets

ANTENNA APPARATUS AND COMMUNICATION APPARATUS

TECHNICAL FIELD

The present invention relates to an ideal antenna apparatus applied for use in a communication apparatus that uses a comparatively high frequency for wireless communication, such as a communication apparatus for a wireless LAN system, for example, and also to a communication apparatus provided with such an antenna apparatus.

BACKGROUND ART

In recent years, various types of wireless transmission systems that use comparatively high frequencies such as from several hundred MHz to several GHz for wireless transmission have proliferated. For example, technologies that use the 2 GHz band, the 5 GHz band, etc. have been developed as wireless LAN systems. Technologies of various methods are being developed and implemented as antenna apparatus provided in wireless communication apparatus that use such bands.

In PTL 1, there is a description of an exemplary antenna for this type of communication apparatus. The technology described in PTL 1 is disposed with a plurality of antenna elements and is configured to have what is called diversity.

CITATION LIST

Patent Literature

PTL 1: Japanese Unexamined Patent Application Publication (Translation of PCT Application) No. 2009-514292

SUMMARY OF INVENTION

Technical Problem

Meanwhile, technologies that use a comparatively wide band as the band used for wireless transmission in a wireless transmission system are increasing, and wide band technologies are desired as antennas for use with comparatively high frequency bands such as from several MHz to several GHz.

Also, even for antennas having diversity, antennas having a simple and compact configuration with better diversity characteristics are desired.

The present invention takes as an object to provide an antenna apparatus having wide band characteristics.

Also, the present invention takes as an object to provide an antenna apparatus having favorable diversity characteristics.

Solution to Problem

The present invention is an antenna apparatus that includes a first antenna element, a second antenna element, and a branch circuit to which the first antenna element and the second antenna element are coupled via respectively separate transmission lines.

Additionally, a delay process is conducted on one of the transmission lines by modifying the lengths of the transmission line coupling the first antenna element to the branch circuit and the transmission line coupling the second antenna element to the branch circuit.

By conducting this delay adjustment, the input impedance and/or phase of the first and second antenna elements are adjusted, and wider band characteristics than the antenna characteristics of the first and second antenna elements individually are configured.

Advantageous Effects of Invention

According to the present invention, an antenna apparatus provided with two antenna elements is given wider band characteristics than the antenna characteristics of a single antenna element individually, and a favorable antenna apparatus having wide band characteristics with a comparatively simple configuration is obtained. Also, the wireless communication characteristics of a communication apparatus provided with such an antenna apparatus can be made favorable.

DESCRIPTION OF EMBODIMENTS

Embodiments of the present invention will be explained in the following order.

Figure 2:
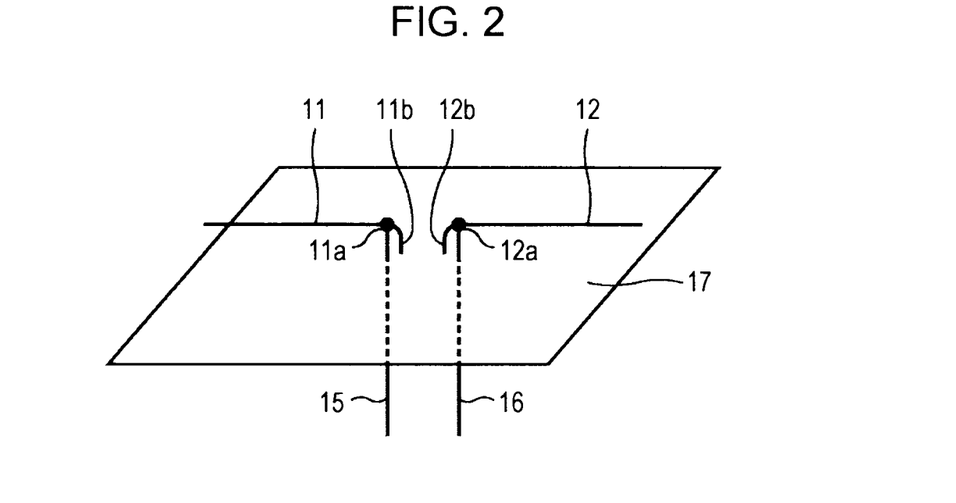
FIG. 2 is an explanatory diagram illustrating an exemplary disposition of an antenna apparatus of a first embodiment of the present invention.
Figure 3:
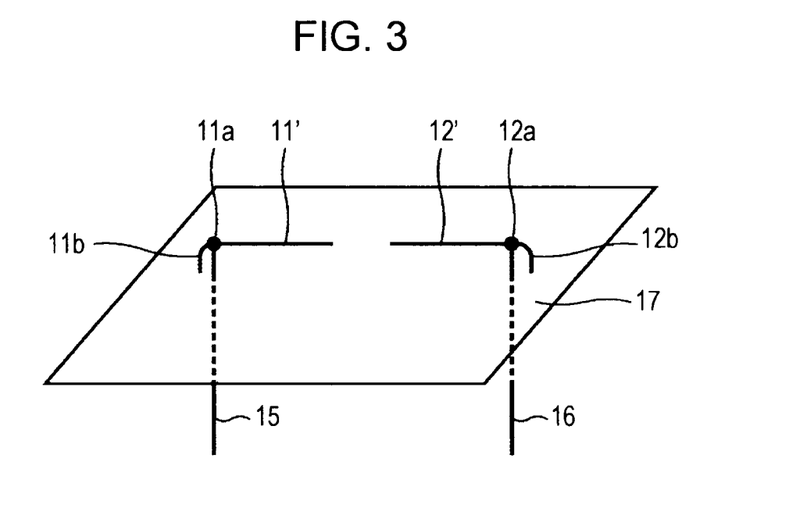
FIG. 3 is an explanatory diagram illustrating another exemplary disposition of an antenna apparatus of a first embodiment of the present invention.

1. First embodiment
1.1 Configuration of antenna apparatus (FIG. 1)
1.2 Exemplary disposition of antenna elements (Ex. 1: FIG. 2)
1.3 Exemplary disposition of antenna elements (Ex. 2: FIG. 3)
1.4 Exemplary characteristics (FIG. 4)
1.5 Exemplary disposition of Ex. 2 antenna (FIGS. 5, 6)
1.6 Exemplary disposition of Ex. 2 antenna (FIGS. 7, 8)
1.7 Exemplary characteristics of FIG. 7 configuration (FIGS. 9, 10, 11)
2. Second embodiment
2.1 Configuration of antenna apparatus (FIGS. 12, 13)
2.2 Exemplary characteristics (FIGS. 14, 15, 16)
3. Third embodiment
3.1 Configuration of antenna apparatus (FIGS. 17, 18)
3.2 Exemplary characteristics (FIG. 19)
4. Modifications

1. First Embodiment

Hereinafter, an exemplary first embodiment of the present invention will be explained with reference to FIGS. 1 to 4.

1.1 Configuration of Antenna Apparatus

Figure 1:
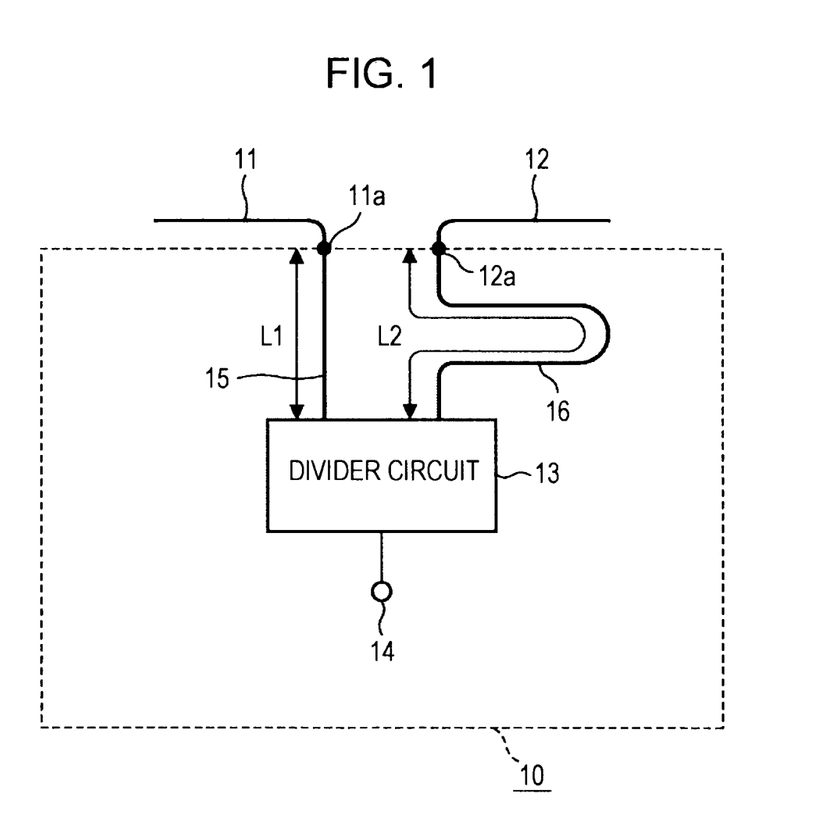
FIG. 1 is a configuration illustrating an exemplary antenna apparatus of a first embodiment of the present invention.

FIG. 1 is a diagram illustrating an exemplary configuration of a communication apparatus provided with an antenna apparatus of the present embodiment.

To summarize the configuration of the antenna apparatus illustrated in FIG. 1, it includes a first antenna element 11, a second antenna element 12, and a divider circuit 13 to which the first antenna element 11 and the second antenna element 12 are coupled by respectively separate transmission lines 15 and 16. Additionally, it is configured such that a delay process is conducted on one of the transmission lines by modifying the lengths of the transmission line 15 coupling the first antenna element 11 to the divider circuit 13 and the transmission line 16 coupling the second antenna element 12 to the divider circuit 13. By conducting such a delay process, the input impedance and/or phase of the first and second antenna elements 11 and 12 are adjusted, and wider band characteristics than the antenna characteristics of the first and second antenna elements 11 and 12 individually are configured.

Next, a specific configuration of the antenna apparatus illustrated in FIG. 1 will be explained.

A communication apparatus 10 is a wireless communication apparatus that conducts wireless communication in a frequency band from several hundred MHz to several GHz, for example, and the first antenna element 11 and the second antenna element 12 are provided as an antenna apparatus attached to the communication apparatus 10.

In the case of the present embodiment, the respective antenna elements 11 and 12 are configured as what is called an inverted F monopole antenna, with the respective antenna elements 11 and 12 taken to be elements of equal length. The details of exemplary dispositions of the two antenna elements 11 and 12 are discussed later, but herein the two rod-shaped antenna elements 11 and 12 are spaced a given interval apart and are disposed so as to line up in a nearly straight line. In the example in FIG. 1 herein, the two antenna elements 11 and 12 are disposed in a straight line, but the two antenna elements 11 and 12 may also be disposed at an angle to some degree.

In the first antenna element 11, a feed point 11a of the first antenna element 11 is coupled to the divider circuit (branch circuit) 13 via the transmission line 15, while in the second antenna element 12, a feed point 12a of the antenna element 12 is coupled to the divider circuit 13 via the transmission line 16. The divider circuit 13 internally couples the two transmission lines 15 and 16, combines obtained signals received by the two antenna elements 11 and 12, and supplies them to a feed port 14. Also, a signal obtained from the feed port 14 when transmitting is divided (split) between the two antenna elements 11 and 12.

Herein, between the two transmission lines 15 and 16, the length of one transmission line 16 is made longer than the other transmission line 15, and is configured to function as a delay line. For example, in the case of configuring as an antenna for sending and receiving in the 2 GHz band, the length L1 of the transmission line 15 is taken to be 100 mm, while the length L2 of the transmission line 16 that functions as a delay line is taken to be 160 mm. The values for these lengths L1 and L2 are an example.

1.2 Exemplary Disposition of Antenna Elements (Ex. 1)

FIG. 2 illustrates an exemplary disposition of the antenna elements 11 and 12.

As illustrated in FIG. 2, antenna elements 11 and 12 respectively configured as inverted F monopole antennas are disposed so as to line up in a straight line on the surface of a GND plane 17 which is a ground potential part, being separated from the surface by a slight distance.

Additionally, the feed point 11a of the first antenna element 11 is coupled to the transmission line 15. The feed point 11a is made to couple with the GND plane 17 via a bonding conductor 11b.

Also, the feed point 12a of the second antenna element 12 is coupled to the transmission line 16. The feed point 12a is made to couple with the GND plane 17 via a bonding conductor 12b.

In the case of the example in FIG. 2, the feed point 11a of the first antenna element 11 and the feed point 12a of the second antenna element 12 are put in close proximity.

1.3 Exemplary Disposition of Antenna Elements (Ex. 2)

FIG. 3 illustrates another exemplary disposition of antenna elements 11' and 12'.

In the case of the example in FIG. 3, two antenna elements 11' and 12' are likewise disposed in a straight line. Additionally, the dispositional relationship of the two antenna elements 11' and 12' is the reverse of the example in FIG. 2.

In other words, as illustrated in FIG. 3, antenna elements 11' and 12' respectively configured as inverted F monopole antennas are disposed with the feed point 11a of the first antenna element 11' and the feed point 12a of the second antenna element 12' separated. Additionally, the tip of the first antenna element 11' and the tip of the second antenna element 12' are put in close proximity.

In the example in FIG. 3, the two antenna elements 11' and 12' are disposed in a straight line, but the two antenna elements 11' and 12' likewise may be disposed at an angle to some degree.

In the case of configuring an antenna apparatus, either the disposition illustrated in FIG. 2 or the disposition illustrated in FIG. 3 may be applied. Also, although antenna element dispositions are not explained in the second and third embodiments later discussed, the configuration in FIG. 2 or FIG. 3 is applicable.

1.4 Exemplary Characteristics

Figure 4:
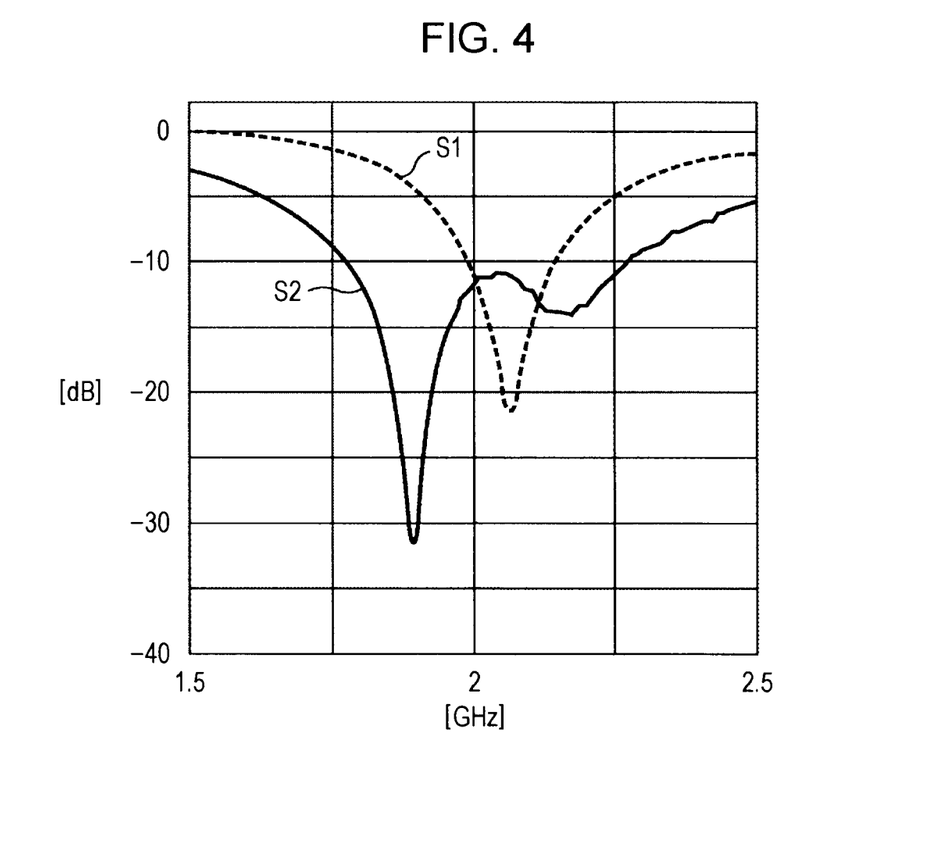
FIG. 4 is a chart illustrating exemplary frequency characteristics of an antenna apparatus of a first embodiment of the present invention.

FIG. 4 illustrates exemplary frequency characteristics of antenna elements of the present embodiment, wherein the horizontal axis represents the 2 GHz frequency band and the vertical axis represents the return loss.

In FIG. 4, the characteristics S1 indicated by a broken line expresses frequency characteristics for the case of an antenna apparatus wherein the first antenna element 11 is used individually. The characteristics S2 indicated by a solid line expresses frequency characteristics for the case of an antenna apparatus with the configuration of the present embodiment illustrated in FIG. 1.

In FIG. 4, in the case where for example a frequency range for which a return loss of −10 dB or more is obtained is taken to be the useable range for the antenna apparatus, the bandwidth in which sending and receiving is possible is approximately 144 MHz in the case of the characteristics S1 for an antenna apparatus using a single antenna element individually. In contrast, the bandwidth in which sending and receiving is possible is approximately 483 MHz in the case of the characteristics S2 for an antenna apparatus with the configuration in FIG. 1.

Consequently, according to an antenna apparatus with a configuration of the present embodiment, the antenna characteristics can be spread over an extremely wide band. This band widening is due to lengthening one transmission line 16 from between the transmission lines 15 and 16 and configuring it as a delay line. In other words, by having a delay line, the input impedance or phase of the respective antenna elements 11 and 12 are adjusted, and the comprehensive characteristics S2 can be widened more than the characteristics S1 of just a single antenna element. As discussed earlier for example, a length of 60 mm is given by taking one transmission line 15 to be 100 mm and the other transmission line 16 to be 160 mm, and by providing an approximately 70° phase differential with respect to the 2 GHz frequency, band widening can be designed by combination of signals with that phase differential.

1.5 Exemplary Disposition of Ex. 2 Antenna

Next, a more specific exemplary configuration of the antenna apparatus in the example in FIG. 3 will be explained with reference to FIGS. 5 and 6.

Figure 5:
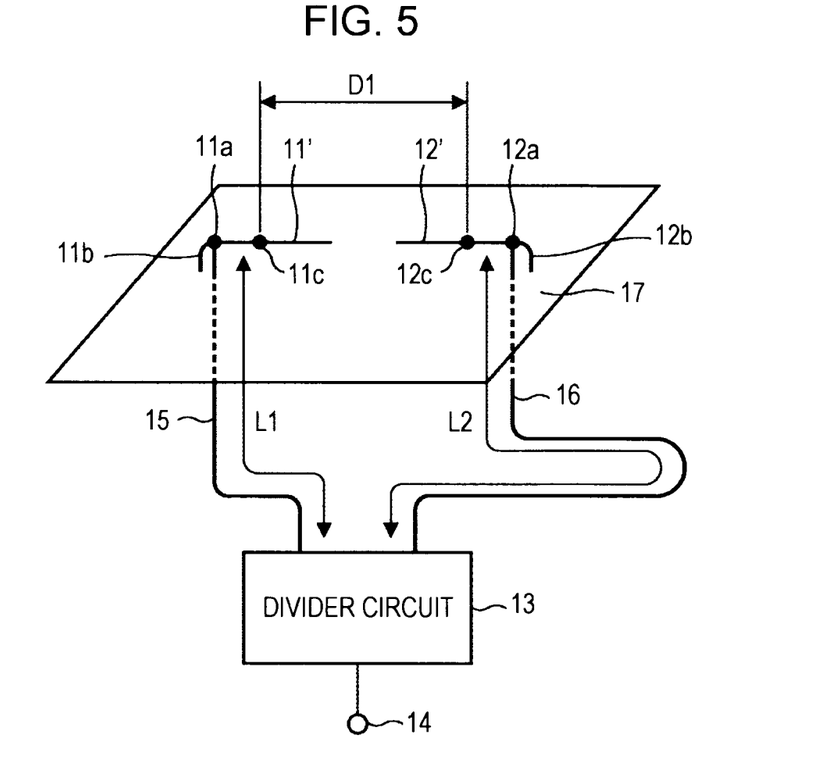
FIG. 5 is a configuration illustrating a specific exemplary disposition of the antenna apparatus in the example in FIG. 3.
Figure 6:
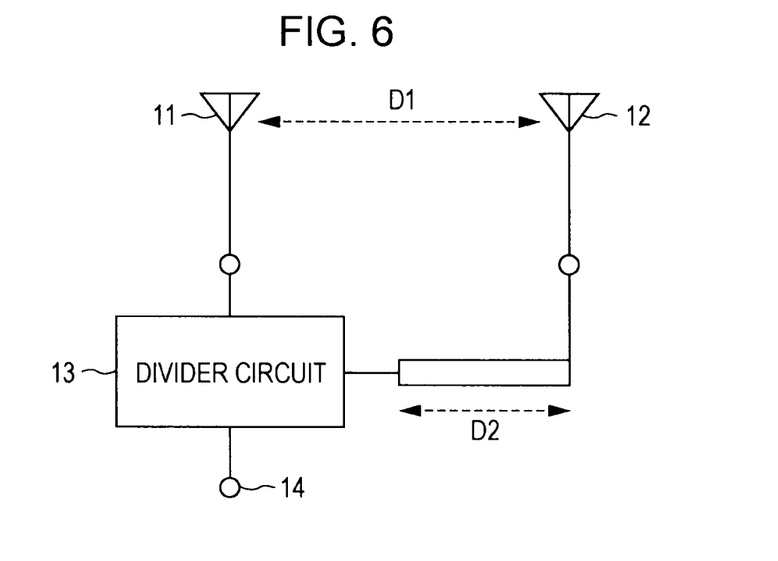
FIG. 6 is an explanatory diagram illustrating a disposed state of the antenna apparatus in the example in FIG. 5.

To summarize the configuration of the antenna apparatus illustrated in FIGS. 5 and 6, a first antenna element 11 and a second antenna element 12 are installed separated by a distance D1. The distance D1 is the distance linking the sites where the absolute value is maximized in the current distribution over the respective antenna elements. The first antenna element 11 and the second antenna element 12 are coupled to a divider circuit 13 via respectively separate transmission lines 15 and 16. The distance differential between the transmission lines 15 and 16 is taken to be a distance D2. Additionally, it is configured such that the parameters $|D1-D2|=m\cdot\lambda_0$ and $D1+D2=n\cdot\lambda_0$ are satisfied when m is taken to be an integer equal to or greater than 0 and n is taken to be an integer equal to or greater than 1.

A specific example will now be explained with reference to FIGS. 5 and 6. The configuration illustrated in FIG. 5 is the same as the antenna apparatus illustrated in FIG. 3. In FIG. 5, a state is illustrated where a distance D1 is set between a first antenna element 11' and a second antenna element 12'. This distance D1 is the distance between a site 11c where the absolute value is maximized in the current distribution over the element of the first antenna element 11', and a site 12c where the absolute value is maximized in the current distribution over the element of the second antenna element 12'.

Also, L2−L1=D2 is taken to hold, where L1 is taken to be the length of the transmission line 15 coupling the first antenna element 11' to the divider circuit 13, and L2 is taken to be the length of the transmission line 16 coupling the second antenna element 12' to the divider circuit 13. In other words, the length differential between the transmission line 15 and the transmission line 16 is taken to be D2. This distance D2 is equivalent to the length of a delay line comprised by the transmission lines.

FIG. 6 simply illustrates the distances D1 and D2 defined in this way. Two antenna elements 11 and 12 are installed separated by a distance D1, while in addition, the transmission line lengths differ by a distance D2. In FIG. 6, these are illustrated as antenna elements 11 and 12, but is the same even with antenna elements 11' and 12'.

The configuration of the antenna apparatus illustrated in FIG. 6 will now be explained. When D1 and D2 are defined in this way, it is preferable to compute values for D1 and D2 and manufacture an antenna apparatus so as to yield the following formulas.

$$|D1-D2|=m\cdot\lambda_0$$

$$D1+D2=n\cdot\lambda_0$$

Herein, m is an integer equal to or greater than 0, and n is an integer equal to or greater than 1. $\lambda_0$ is the wavelength of the center frequency at which transmitting or receiving is conducted in the antenna apparatus.

As a preferable example, a configuration taking m=0∩n=1 is conceivable, for example. By configuring in this way, coupling from the first antenna element 11 to the second antenna element 12 and coupling from the second antenna element 12 to the first antenna element 11 both become in-phase. For this reason, the individual antennas are coupled to operate as a single large antenna, thus enlarging the antenna volume and enlarging the radiant efficiency. Also, delay line loss produced by the difference in the length of the transmission lines becomes smaller.

Another example of D1 and D2 in FIGS. 5 and 6 will be explained. D1 and D2 may also be set as indicated by the following formulas.

$$D1=(\tfrac{1}{4}+m')\lambda_0$$

$$D2=(\tfrac{1}{4}+n')\lambda_0$$

Herein, m' is an integer equal to or greater than 1, and n' is an integer equal to or greater than 0. $\lambda_0$ is the wavelength of the center frequency at which transmitting or receiving is conducted in the antenna apparatus.

In the case of this example, m'=n'=0 is most desirable.

In the case of setting D1 and D2 as in this example, coupling from the first antenna element 11 to the second antenna element 12 becomes in-phase, while coupling from the second antenna element 12 to the first antenna element 11 becomes anti-phase. Consequently, radiant directionality heading from the first antenna element 11 to the second antenna element 12 becomes stronger.

Yet another example of D1 and D2 in FIGS. 5 and 6 will be explained. D1 and D2 may also be set as indicated by the following formulas.

$$D1=(\tfrac{3}{4}+m')\lambda_0$$

$$D2=(\tfrac{1}{4}+n')\lambda_0$$

Herein, m' is an integer equal to or greater than 1, and n' is an integer equal to or greater than 0. $\lambda_0$ is the wavelength of the center frequency at which transmitting or receiving is conducted in the antenna apparatus.

In the case of this example, m'=n'=0 is most desirable.

In the case of setting D1 and D2 as in this example, coupling from the first antenna element 11 to the second antenna element 12 becomes anti-phase, while coupling from the second antenna element 12 to the first antenna element 11 becomes anti-phase. Consequently, radiant directionality heading from the first antenna element 11 to the second antenna element 12 becomes stronger.

As these respective examples demonstrate, it becomes possible to adjust to a desired directionality and radiant efficiency by arbitrarily controlling a distance D1 between two antenna elements and a distance D2 of a delay line.

1.6 Exemplary Disposition of Ex. 2 Antenna

Figure 7:
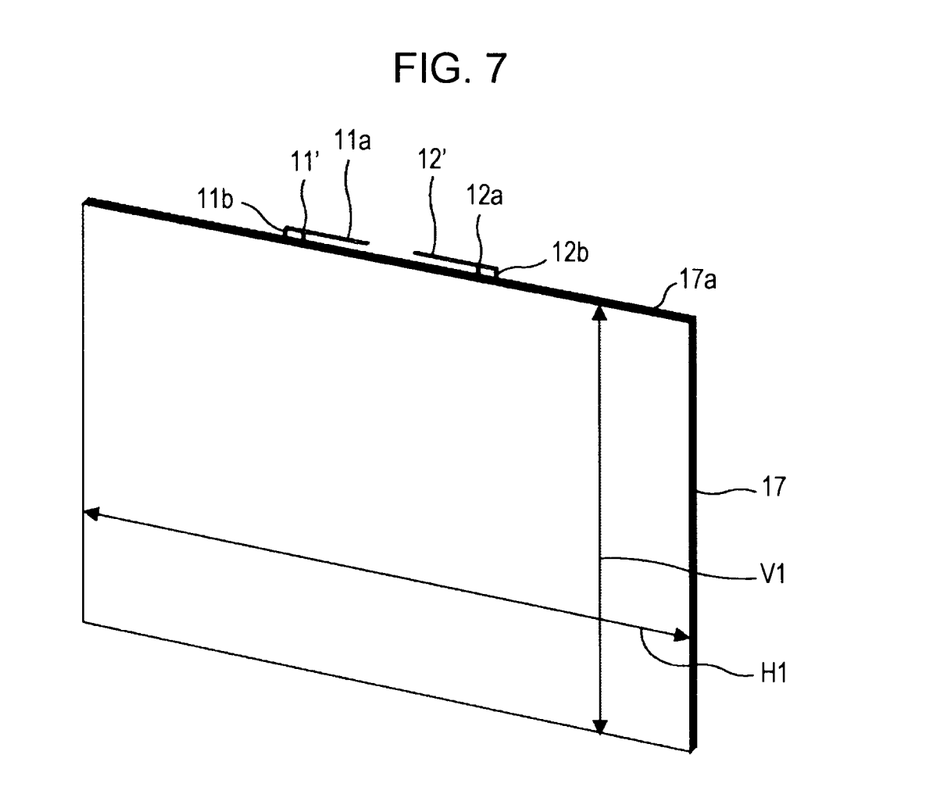
FIG. 7 is a perspective view illustrating another specific exemplary disposition of the antenna apparatus in the example in FIG. 3.
Figure 8:
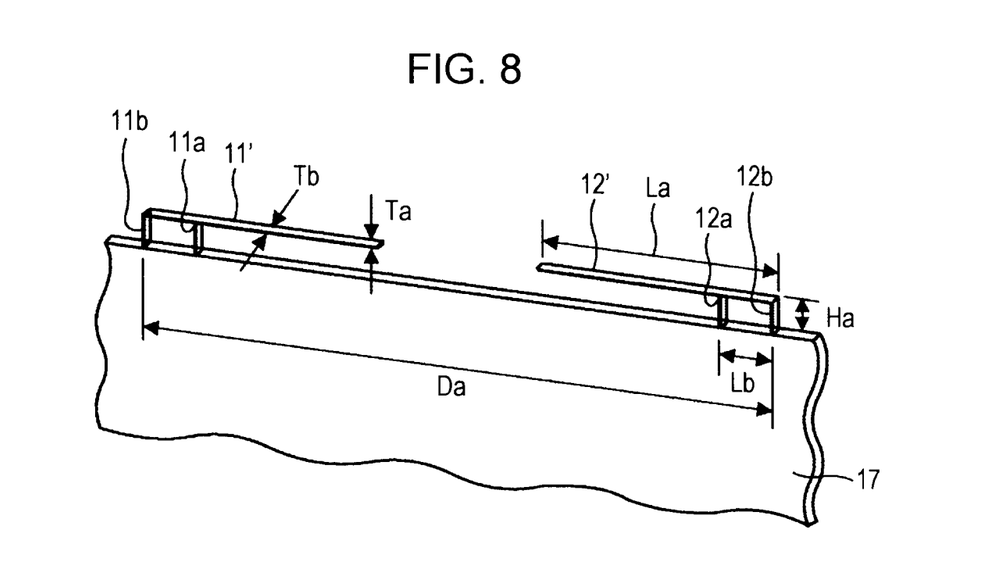
FIG. 8 is a perspective view illustrating an enlargement of the relevant part of FIG. 7.

FIGS. 7 and 8 are an example of the antenna apparatus illustrated in FIG. 3 installed on an edge face of a GND plane 17, which is a ground potential part. FIG. 8 is a diagram illustrating an enlargement of the antenna element portion of FIG. 7.

To summarize the configuration of the antenna apparatus illustrated in FIGS. 7 and 8, a first antenna element 11' and a second antenna element 12' are installed on an edge 17a of a GND plane 17 which is a ground potential part, being separated by a given distance. The direction in which the respective antenna elements 11' and 12' extend in parallel and the edge 17a are made parallel. Furthermore. The height direction separating the respective antenna elements 11' and 12' from the edge 17a is taken to be parallel to the direction in which the GND plane 17 extends as a plane. Regarding the installed state of the first antenna element 11' and second antenna element 12' and the configuration of transmission lines coupled to the respective antenna elements, the configuration explained with FIGS. 5 and 6, etc. is applied, for example.

A specific exemplary configuration will be explained with reference to FIGS. 7 and 8. In this example, dimensions of respective parts are illustrated as one example in the case where the center frequency of the frequency at which transmitting and receiving is conducted in an antenna apparatus is 2 GHz.

As illustrated in FIG. 7, a GND plane 17 which is a ground potential part is taken to have a vertical length V1 of approximately 190 mm and a horizontal length H1 of approximately 300 mm. The size of this GND plane 17 assumes the size of a board mounted in a notebook computer apparatus, for example.

Additionally, as illustrated in FIG. 7, a first antenna element 11' and an second antenna element 12' are installed on a edge 17a of a GND plane 17 which is a ground potential part, being separated by a given distance and in a facing state with their tips in close proximity on the edge 17a of the GND plane 17. The direction in which the respective antenna elements 11' and 12' extend in parallel and the edge 17a are made parallel. The length La of the respective antenna elements 11' and 12' (FIG. 8) is taken to be approximately 38 mm. The length Lb by which bonding conductors 11b and 12b extend from feed points 11a and 12a parallel to the edge 17a are taken to be approximately 8.5 mm.

The height direction separating the respective antenna elements 11' and 12' from the edge 17a is taken to be parallel to the direction in which the GND plane 17 extends as a plane. This height Ha separating the antenna elements 11' and 12' from the edge 17a (FIG. 8) is taken to be approximately 5 mm.

As illustrated by enlargement in FIG. 8, a wire material having a thickness Ta of approximately 0.1 mm and a width Tb of approximately 2 mm is used for the material constituting the respective antenna elements 11' and 12'.

Furthermore, the length Da of the respective antenna elements 11' and 12' including the bonding conductors 11b and 12b (FIG. 8) is taken to be approximately 102 mm. This Da is a length including the distance between the tips of the two antenna elements 11' and 12'.

Herein, a length, height, thickness, and width are illustrated for one of the antenna elements 11' and 12' in FIG. 8, but these values are taken to be the same for the two antenna elements 11' and 12'.

Regarding the configuration of the transmission lines and divider circuit coupled to the respective antenna elements 11' and 12', the configuration explained with FIGS. 5 and 6, etc. is applied, for example.

1.7 Exemplary Characteristics of FIG. 7 Configuration

Figure 9:
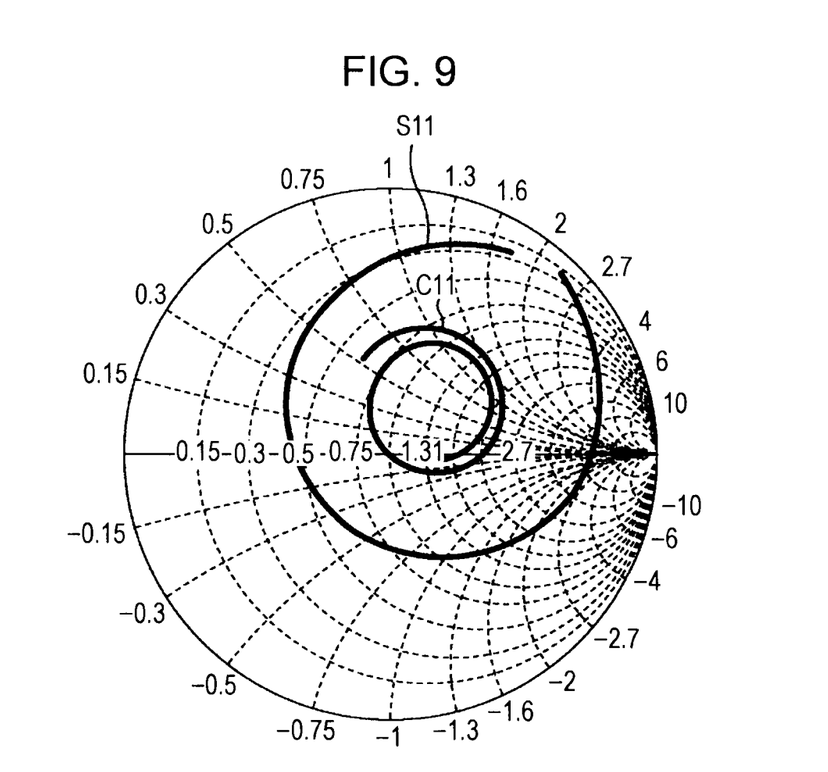
FIG. 9 is a chart of the example in FIG. 7.
Figure 10:
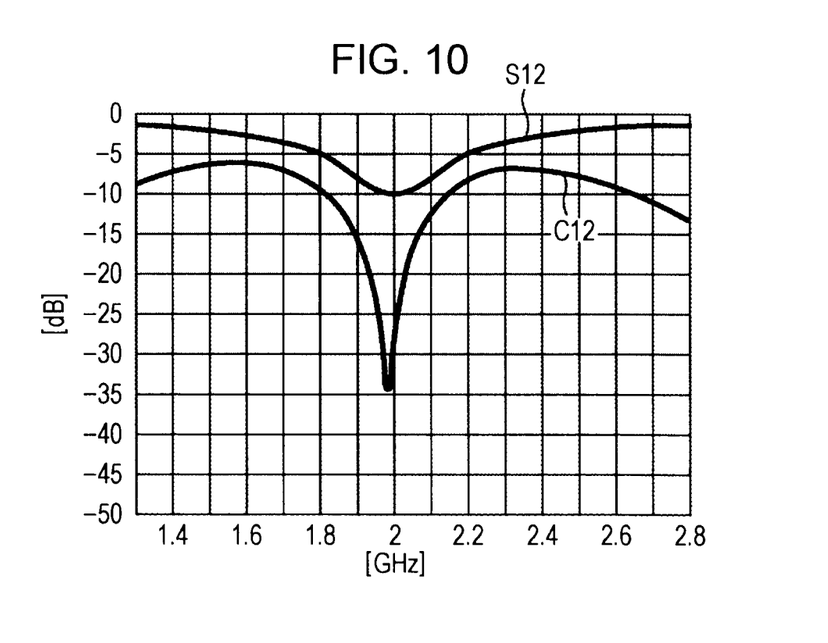
FIG. 10 is a chart of the example in FIG. 7.
Figure 11:
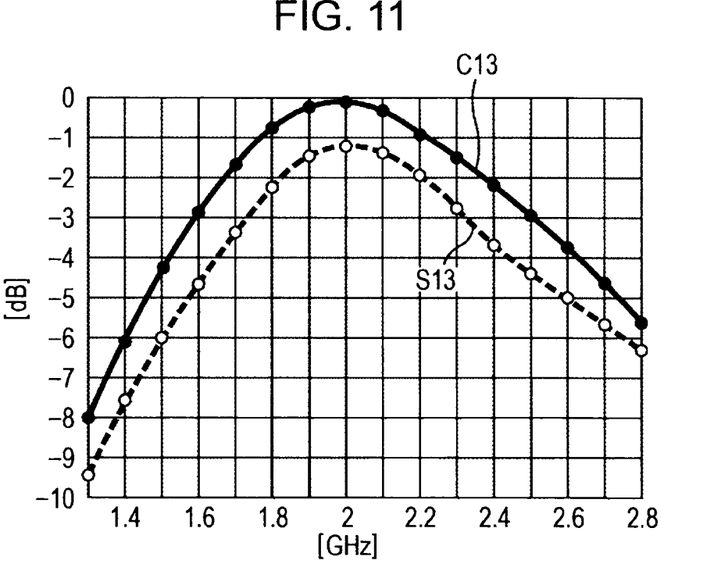
FIG. 11 is a chart of the example in FIG. 7.

Next, exemplary radiant characteristics of an antenna apparatus with the configuration in FIGS. 7 and 8 are illustrated in FIGS. 9, 10, and 11.

FIG. 9 is characteristics illustrated by a Smith chart. The characteristics S11 are radiant characteristics of an antenna apparatus installed with just a first antenna element 11', while the characteristics C11 are radiant characteristics for the case of a configuration provided with two antenna elements 11' and 12' as illustrated in FIG. 7.

FIG. 10 is an illustration of return loss characteristics, and illustrates characteristics from 1.3 GHz to 2.8 GHz centered about 2 GHz. The characteristics S12 are return loss characteristics of an antenna apparatus installed with just a first antenna element 11', while the characteristics C12 are return loss characteristics for the case of a configuration provided with two antenna elements 11' and 12' as illustrated in FIG. 7.

FIG. 11 is an illustration of radiant efficiency characteristics, and illustrates characteristics from 1.3 GHz to 2.8 GHz centered about 2 GHz. The characteristics S13 are radiant efficiency characteristics of an antenna apparatus installed with just a first antenna element 11', while the characteristics C13 are radiant efficiency characteristics for the case of a configuration provided with two antenna elements 11' and 12' as illustrated in FIG. 7.

As the radiant efficiency characteristics in FIG. 11 demonstrate, radiant efficiency characteristics are better for an exemplary configuration of the present embodiment provided with two antenna elements 11' and 12' compared to the case of just a single antenna element.

2. Second Embodiment

Hereinafter, an exemplary second embodiment of the present invention will be explained with reference to FIGS. 12 to 16. In FIGS. 12 to 16, identical reference signs are given to portions corresponding to the first embodiment already explained.

The second embodiment is an example of coupling a hybrid circuit which is a 90° phase shifter instead of the divider circuit 13 illustrated in FIG. 1.

2.1 Configuration of Antenna Apparatus

Figure 12:
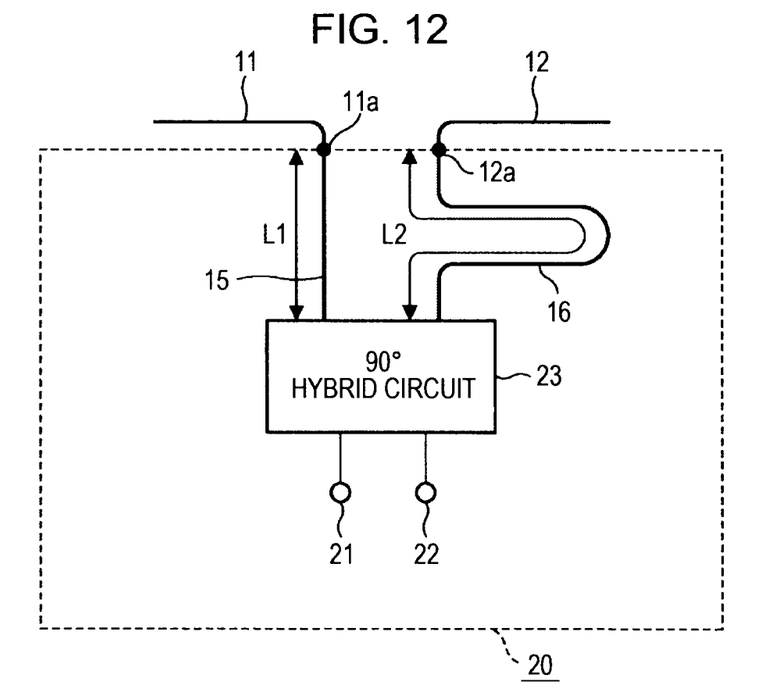
FIG. 12 is a configuration illustrating an exemplary antenna apparatus of a second embodiment of the present invention.

FIG. 12 is a diagram illustrating an exemplary configuration of a communication apparatus provided with an antenna apparatus of the present embodiment.

To summarize the configuration of the antenna apparatus, it is provided with a first antenna element 11 and a second antenna element 12. The first antenna element 11 and the second antenna element 12 are coupled to a 90° hybrid circuit 23 by respectively separate transmission lines 15 and 16. It is configured such that a delay process is conducted on one of the transmission lines by modifying the lengths of the transmission line 15 coupling the first antenna element 11 to the 90° hybrid circuit 23 and the transmission line 16 coupling the second antenna element 12 to the 90° hybrid circuit 23. The 90° hybrid circuit 23 sets the input impedance and/or phase of two ports to which the respective antenna elements 11 and 12 are coupled to a given state.

Next, a specific configuration will be explained with reference to FIG. 12.

A communication apparatus 20 is a wireless communication apparatus that conducts wireless communication in a frequency band from several hundred MHz to several GHz, for example, and a first antenna element 11 and a second antenna element 12 are provided as an antenna apparatus attached to the communication apparatus 20. Regarding exemplary dispositions of the respective antenna elements 11 and 12, herein the configuration explained in FIGS. 1 and 2, etc. for the first embodiment is applied as-is.

Additionally, in the first antenna element 11, a feed point 11a of the first antenna element 11 is coupled to the 90° hybrid circuit 23 via a transmission line 15. In the second antenna element 12, a feed point 12a of the antenna element 12 is coupled to the 90° hybrid circuit 23 via a transmission line 16. The lengths of the transmission line 15 and the transmission line 16 are modified and the transmission line 16 is configured to function as a delay line, similarly to the first embodiment. However, the length of the delay line is not limited to being the same as the length described in the first embodiment.

The 90° hybrid circuit 23 is configured coupled to two feed ports 21 and 22, and may for example couple the respective feed ports 21 and 22 to respectively separate communication circuits.

Figure 13:
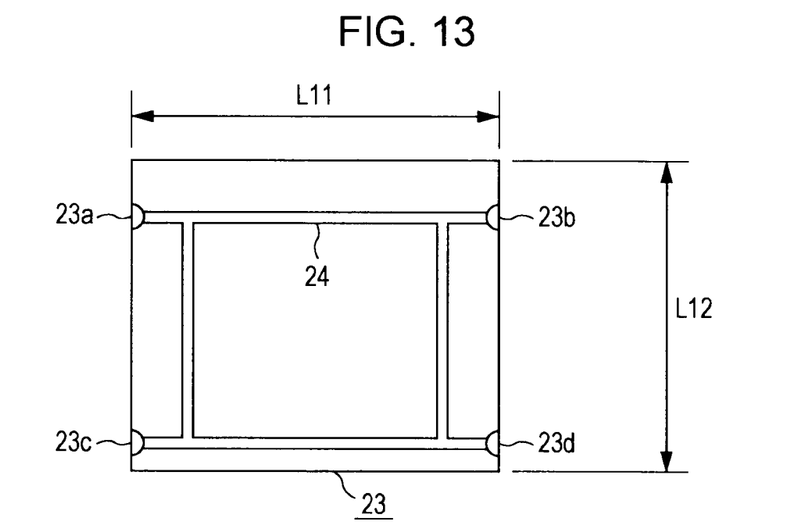
FIG. 13 is a configuration illustrating an exemplary hybrid circuit of a second embodiment of the present invention.

FIG. 13 is a diagram illustrating an exemplary configuration of a 90° hybrid circuit 23. Herein, a conductor pattern 24 on a circuit board is made to constitute a 90° hybrid circuit 23, and is provided with a first port 23a, a second port 23b, a third port 23c, and a fourth port 23d. The length L11 in which the conductor pattern 24 is disposed in the horizontal direction of the board is taken to be approximately 70 mm, and the length L12 in the vertical direction is taken to be approximately 68 mm.

The first through fourth ports 23a to 23d are coupled to adjacent ports by a conductor pattern 24 coupled in a square shape. For example, the first port 23a is coupled to a first antenna element 11 via a transmission line 15, while the second port 23b is coupled to a second antenna element 12 via a transmission line 16. Also, the third port 23c is coupled to a feed port 21, while the fourth port 23d is coupled to a feed port 22.

By preparing such a 90° hybrid circuit 23 in which four ports 23a to 23d are coupled by a conductor pattern 24, signals from two antenna elements 11 and 12 are given a 90° phase differential at a given frequency and combined. Furthermore, the combined signal is obtained at the third port 23c and the fourth port 23d with the 90° phase differential.

Furthermore, by using elements that operate at two given frequencies (800 MHz and 2 GHz, for example) as the antenna elements, signals are given a 90° phase differential at the two frequencies and combined, while also being retrieved with the 90° phase differential.

In the case where the 90° hybrid circuit 23 is a 90° phase shifter, the signals at the four ports 23a to 23d of that 90° hybrid circuit 23 can be represented by an S-matrix as follows.

$$\frac{1}{\sqrt{2}}\begin{bmatrix} 0 & -j & -1 & 0 \\ -j & 0 & 0 & -1 \\ -1 & 0 & 0 & -j \\ 0 & -1 & -j & 0 \end{bmatrix} \quad \text{[Eq. 1]}$$

2.2 Exemplary Characteristics

Figure 14:
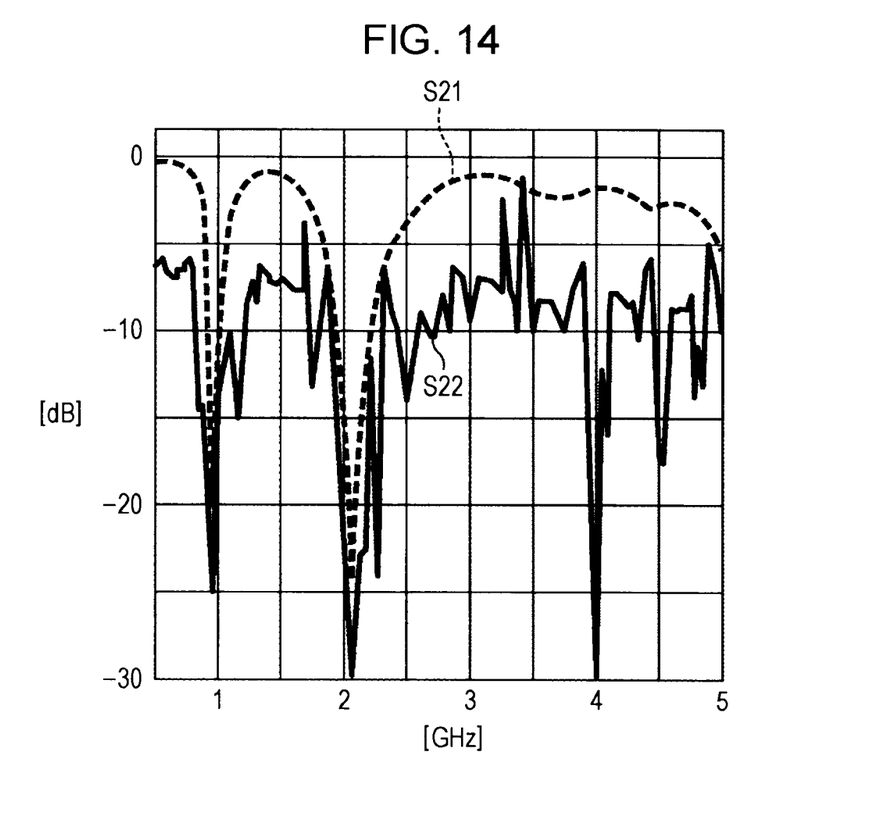
FIG. 14 is a chart illustrating exemplary frequency characteristics of an antenna apparatus of a second embodiment of the present invention.

FIG. 14 illustrates exemplary frequency characteristics of signals obtained at the third port 23c and the fourth port 23d of the 90° hybrid circuit 23 (i.e., signals obtained at the feed ports 21 and 22). The broken line characteristics S21 represent characteristics for the case of using just a single first antenna element 11 by way of reference, while the solid line characteristics S12 are signals obtained at the third port 23c and the fourth port 23d.

As the characteristics S12 illustrated in FIG. 14 demonstrate, band widening can be designed at a plurality of frequency bands. In the example in FIG. 14, band widening is designed at the 800 MHz band and the 2 GHz band, for example.

Figure 15:
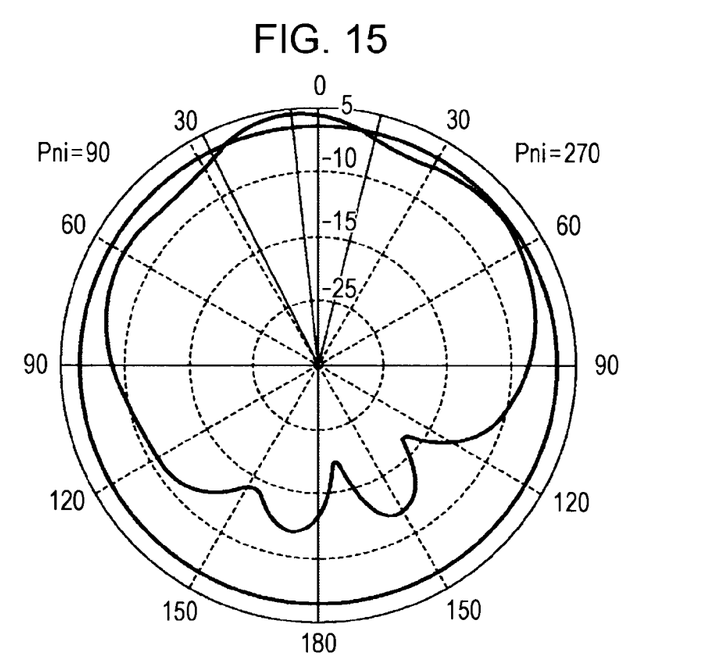
FIG. 15 is a chart illustrating exemplary directionality characteristics of an antenna apparatus of a second embodiment of the present invention.
Figure 16:
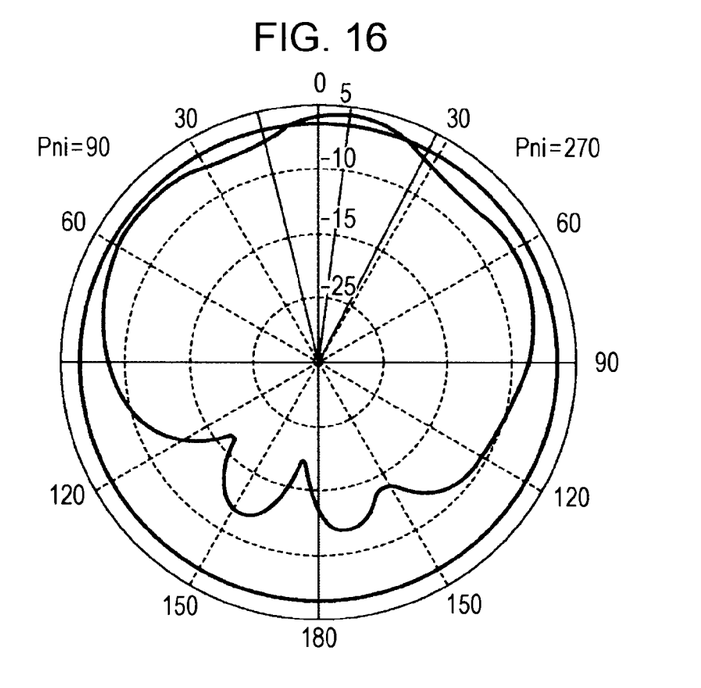
FIG. 16 is a chart illustrating exemplary directionality characteristics of an antenna apparatus of a second embodiment of the present invention.

Also, a signal obtained at the third port 23c and a signal obtained at the fourth port 23d have diversity. Namely, FIG. 15 is an exemplary radiant pattern (X-Y plane) of a signal obtained at the third port 23c, while FIG. 16 is an exemplary radiant pattern of a signal obtained at the fourth port 23d, for example. As demonstrated by comparing the pattern in FIG. 15 to the pattern in FIG. 16, the patterns are in a state of shift by a given angle, and have sensitivity in different directions.

Consequently, spatial diversity is achieved between a signal received by supplying a signal obtained at the third port 23c to a communication circuit from a feed port 21, and a signal received by supplying a signal obtained at the fourth port 23d to a communication circuit from a feed port 22.

Furthermore, the 90° hybrid circuit 23 may also be configured to impart an approximately 90° phase differential with respect to a plurality of frequencies, such as two frequencies.

3. Third Embodiment

Figure 17:
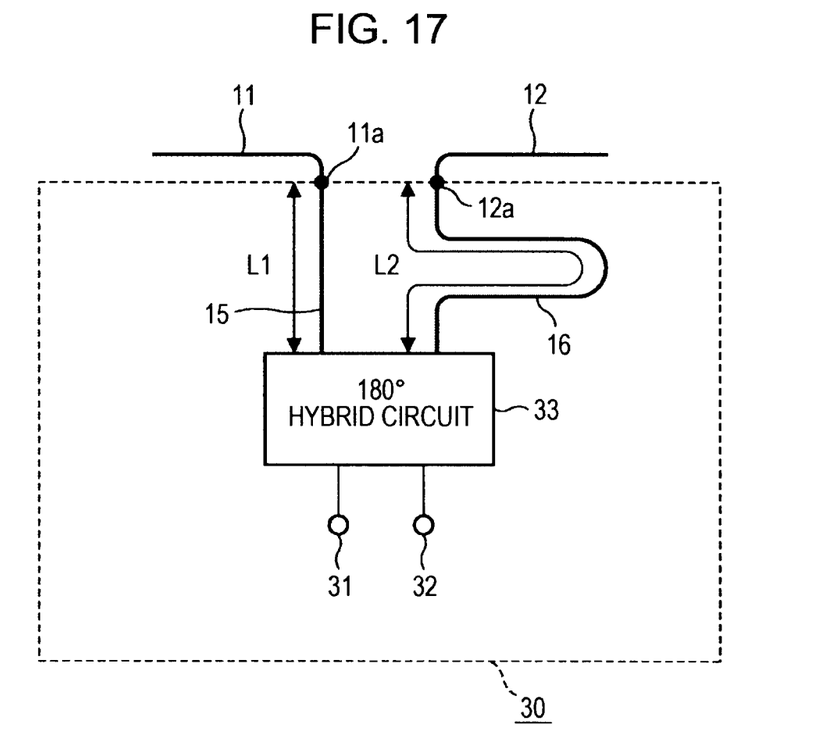
FIG. 17 is a configuration illustrating an exemplary antenna apparatus of a third embodiment of the present invention.
Figure 18:
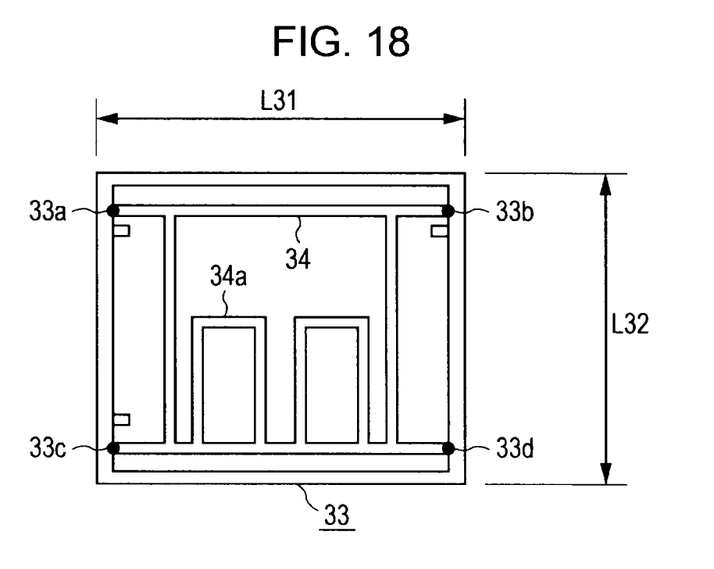
FIG. 18 is a configuration illustrating an exemplary hybrid circuit of a third embodiment of the present invention.
Figure 19:
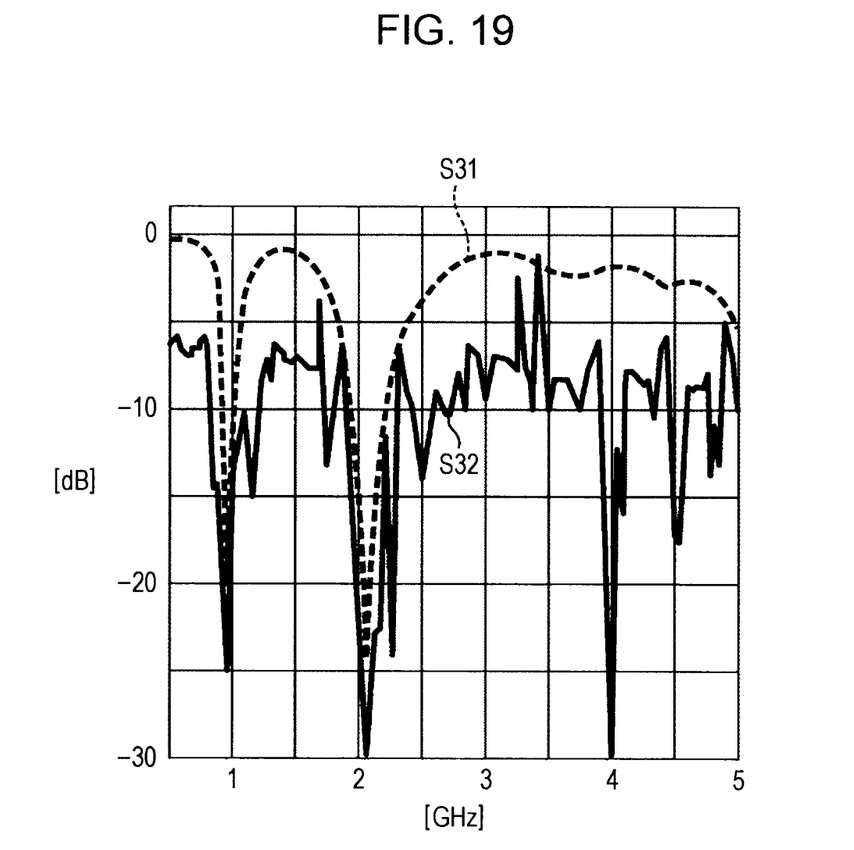
FIG. 19 is a chart illustrating exemplary frequency characteristics of an antenna apparatus of a third embodiment of the present invention.

Hereinafter, an exemplary third embodiment of the present invention will be explained with reference to FIGS. 17 to 19. In FIGS. 17 to 19, identical reference signs are given to portions corresponding to the first and second embodiments already explained.

The third embodiment is an example of coupling a hybrid circuit which is a 180° phase shifter instead of the 90° hybrid circuit 23 illustrated in FIG. 12.

3.1 Configuration of Antenna Apparatus

FIG. 17 is a diagram illustrating an exemplary configuration of a communication apparatus provided with an antenna apparatus of the present embodiment.

To summarize the configuration of the antenna apparatus, it is provided with a first antenna element 11 and a second antenna element 12. The first antenna element 11 and the second antenna element 12 are coupled to a 180° hybrid circuit 33 by respectively separate transmission lines 15 and 16. It is configured such that a delay process is conducted on one of the transmission lines by modifying the lengths of the transmission line 15 coupling the first antenna element 11 to the 180° hybrid circuit 33 and the transmission line 16 coupling the second antenna element 12 to the 180° hybrid circuit 33.

Next, a specific configuration will be explained with reference to FIG. 17.

A communication apparatus 30 is a wireless communication apparatus that conducts wireless communication in a frequency band from several hundred MHz to several GHz, for example, and a first antenna element 11 and a second antenna element 12 are provided as an antenna apparatus attached to the communication apparatus 30. Regarding exemplary dispositions of the respective antenna elements 11 and 12, herein the configuration explained in FIGS. 1 and 2, etc. for the first embodiment is applied as-is.

Additionally, in the first antenna element 11, a feed point 11a of the first antenna element 11 is coupled to the 180° hybrid circuit 33 via a transmission line 15. In the second antenna element 12, a feed point 12a of the antenna element 12 is coupled to the 180° hybrid circuit 33 via a transmission line 16. The lengths of the transmission line 15 and the transmission line 16 are modified and the transmission line 16 is configured to function as a delay line, similarly to the first embodiment. However, the length of the delay line is not limited to being the same as the length described in the first embodiment.

The 180° hybrid circuit 33 is configured coupled to two feed ports 31 and 32, and may for example couple the respective feed ports 31 and 32 to respectively separate communication circuits.

FIG. 18 is a diagram illustrating an exemplary configuration of a 180° hybrid circuit 33. Herein, the 180° hybrid circuit 33 comprises a conductor pattern 34 on a circuit board, and is provided with a first port 33a, a second port 33b, a third port 33c, and a fourth port 33d. The length L31 in which the conductor pattern 34 is disposed in the horizontal direction of the board is taken to be approximately 73 mm, and the length L32 in the vertical direction is taken to be approximately 65 mm.

The first through fourth ports 33a to 33d are coupled to adjacent ports by a conductor pattern 34 coupled in a square shape, but a meander part 34a is provided between the third port 33c and the fourth port 33d. The shape of this conductor pattern 34 is exemplary, and may also taken to be another pattern shape.

The first port 33a is coupled to a first antenna element 11 via a transmission line 15, while the second port 33b is coupled to a second antenna element 12 via a transmission line 16. Also, the third port 33c is coupled to a feed port 31, while the fourth port 33d is coupled to a feed port 32.

By preparing such a 180° hybrid circuit 33 in which four ports 33a to 33d are coupled by a conductor pattern 34, signals from two antenna elements 11 and 12 are given a 180° phase differential at a given frequency and combined. Furthermore, the combined signal is obtained at the third port 33c and the fourth port 33d with the 180° phase differential.

Furthermore, by using elements that operate at two given frequencies (800 MHz and 2 GHz, for example) as the antenna elements, signals are given a 180° phase differential at the two frequencies and combined, while also being retrieved with the 180° phase differential.

In the case where the 180° hybrid circuit 33 is a 180° phase shifter, the signals at the four ports 33a to 33d of that 180° hybrid circuit 33 can be represented by an S-matrix as follows.

$$\frac{1}{\sqrt{2}} \begin{bmatrix} 0 & 1 & 1 & 0 \\ 1 & 0 & 0 & 1 \\ -1 & 0 & 0 & 1 \\ 0 & 1 & -1 & 0 \end{bmatrix} \quad [\text{Eq. 2}]$$

3.2 Exemplary Characteristics

FIG. 19 illustrates exemplary frequency characteristics of signals obtained at the third port 33c and the fourth port 33d of the 180° hybrid circuit 33 (i.e., signals obtained at the feed ports 31 and 32). The broken line characteristics S31 represent characteristics for the case of using just a single first antenna element 11 by way of reference, while the solid line characteristics S32 are signals obtained at the third port 33c and the fourth port 33d.

As the characteristics S32 illustrated in FIG. 19 demonstrate, band widening can be designed at a plurality of frequency bands. In the example in FIG. 19, band widening is designed at the 800 MHz band and the 2 GHz band, for example. Herein, in the case of viewing frequency characteristics only, the 90° hybrid circuit 23 in FIG. 14 and the 180° hybrid circuit 33 in FIG. 19 have the same characteristics.

Also, a signal obtained at the third port 33c and a signal obtained at the fourth port 33d have diversity. However, since there is a 180° phase differential, the radiant pattern differs from the example of a 90° phase differential in FIGS. 15 and 16.

Furthermore, the 180° hybrid circuit 33 may also be configured to impart an approximately 180° phase differential with respect to a plurality of frequencies, such as two frequencies.

4. Modifications

In the second and third embodiments discussed above, a 90° hybrid circuit 23 or a 180° hybrid circuit 33 is coupled after having made one among transmission lines 15 and 16 a delay line, but the transmission lines 15 and 16 may also be taken to have the same length. In other words, it may also be configured such that band widening and diversity are obtained by adjusting just the 90° hybrid circuit 23 or the 180° hybrid circuit 33. Also, in the second and third embodiments, it was configured such that two feed ports are provided and diversity reception could be received, but merely providing a single feed port is acceptable in cases where diversity reception is not required.

Also, in the foregoing explanation, it is explained that phase is adjusted by a delay line and hybrid circuit in the respective embodiments, but it may also be configured such that the input impedance of antenna elements is adjusted. In other words, it may be configured to design band widening by adjusting one or both of input impedance and phase with a delay line. Alternatively, it may also be configured to design band widening by adjusting one or both of input impedance and phase with a 90° hybrid circuit 23 or a 180° hybrid circuit 33.

Also, although the first and second antenna elements are described as inverted F antennas by way of example, antenna elements of another format may also be applied. In this case, besides the case of using elements wherein the impedances of the first and second antenna elements have the same frequency characteristics, it may also be configured such that the impedances of the first and second antenna elements have different frequency characteristics.

Also, the center frequency used to calculate the characteristics described in the respective exemplary embodiments may be other than the frequency at the exact center of the frequency band used by an antenna apparatus, and may be a frequency nearly at the center. Alternatively, it may also be a representative frequency at which transmission and reception is conducted in an antenna apparatus, for example.

| Reference Signs List | |
|---|---|
| 10 | communication apparatus |
| 11, 11' | first antenna element |
| 11a | feed point |
| 11b | bonding conductor |
| 11c | current distribution maxima |
| 12, 12' | second antenna element |
| 12a | feed point |
| 12b | bonding conductor |
| 12c | current distribution maxima |
| 13 | divider circuit |
| 14 | feed port |
| 15 | transmission line |
| 16 | transmission line (delay line) |
| 17 | GND plane |
| 17a | edge |
| 20 | communication apparatus |
| 21 | feed port |
| 22 | feed port |
| 23 | 90° hybrid circuit |
| 24 | conductor pattern |
| 30 | communication apparatus |
| 31 | feed port |
| 32 | feed port |
| 33 | 180° hybrid circuit |
| 34 | conductor pattern |
| 34a | meander part |

The invention claimed is:

1. An antenna apparatus including:
a first antenna element;
a second antenna element; and
a branch circuit to which the first antenna element and the second antenna element are coupled via respectively separate transmission lines;
wherein
a delay process is conducted on one of the transmission lines by modifying the lengths of the transmission line coupling the first antenna element to the branch circuit and the transmission line coupling the second antenna element to the branch circuit, thereby adjusting the input impedance and/or phase of the first and second antenna elements such that wider band characteristics than the antenna characteristics of the first and second antenna elements individually are configured,
when the distance between a site where the absolute value is maximized over a current distribution of the first antenna element and a site where the absolute value is maximized over a current distribution of the second antenna element is taken to be the antenna-to-antenna distance, and when the length of a delay line produced due to a difference in the lengths of the two transmission lines is taken to be the delay line distance,
the absolute value of the difference between the antenna-to-antenna distance and the delay line distance is made equal to an integer multiple, equal to or greater than 0, of the wavelength of a frequency at which transmitting or receiving is conducted in the antenna apparatus, and
the sum of the antenna-to-antenna distance and the delay line distance is made equal to an integer multiple, equal to or greater than 1, of the wavelength of a near-center frequency at which transmitting or receiving is conducted in the antenna apparatus.

2. The antenna apparatus according to claim 1, wherein the branch circuit is configured as a hybrid circuit in which the input impedance and/or phase at two ports coupled to the respective antenna elements are set to a given state.

3. The antenna apparatus according to claim 1, wherein the branch circuit is configured as a hybrid circuit provided with two ports as ports coupled to a communication circuit, and
received signals obtained at the two ports coupled to the communication circuit have diversity characteristics.

4. The antenna apparatus according to claim 1, wherein the branch circuit is configured as a hybrid circuit in which the input impedance and/or phase at two ports coupled to the respective antenna elements are set to a given state, and also provided with two ports as ports coupled to a communication circuit, and
received signals obtained at the two ports coupled to the communication circuit have diversity characteristics.

5. The antenna apparatus according to claim 4, wherein the hybrid circuit imparts an approximately 90° phase differential to a first frequency.

6. The antenna apparatus according to claim 4, wherein the hybrid circuit imparts an approximately 180° phase differential to a first frequency.

7. The antenna apparatus according to claim 4, wherein the hybrid circuit imparts an approximately 90° phase differential to a first frequency, and additionally imparts an approximately 90° phase differential to a second frequency.

8. The antenna apparatus according to claim 4, wherein the hybrid circuit imparts an approximately 180° phase differential to a first frequency, and additionally imparts an approximately 180° phase differential to a second frequency.

9. The antenna apparatus according to claim 4, wherein the impedances of the first and second antenna elements have the same frequency characteristics.

10. The antenna apparatus according to claim 1, wherein the impedances of the first and second antenna elements have different frequency characteristics.

11. A communication apparatus including an antenna apparatus, wherein
the antenna apparatus includes
a first antenna element,
a second antenna element, and
a branch circuit to which the first antenna element and the second antenna element are coupled via respectively separate transmission lines, and wherein
a delay process is conducted on one of the transmission lines by modifying the lengths of the transmission line coupling the first antenna element to the branch circuit and the transmission line coupling the second antenna element to the branch circuit, thereby adjusting the input impedance and/or phase of the first and second antenna elements such that wider band characteristics than the antenna characteristics of the first and second antenna elements individually are configured,
when the distance between a site where the absolute value is maximized over a current distribution of the first antenna element and a site where the absolute value of maximized over a current distribution of the second antenna element is taken to be the antenna-to-antenna distance, and when the length of a delay line produced due to a difference in the lengths of the two transmission lines is taken to be the delay line distance, the absolute value of the difference between the antenna-to-antenna distance and the delay line distance is made equal to an integer multiple, equal to or greater than 0, of the wavelength of a frequency at which transmitting or receiving is conducted in the antenna apparatus, and
the sum of the antenna-to-antenna distance and the delay line distance is made equal to an integer multiple, equal to or greater than 1, of the wavelength of a near-center frequency at which transmitting or receiving is conducted in the antenna apparatus.

* * * * *